(12) United States Patent
Roh

(10) Patent No.: US 8,479,437 B2
(45) Date of Patent: Jul. 9, 2013

(54) AUTOMATIC HOOK SETTING DEVICE

(75) Inventor: Warren Roh, Monument, CO (US)

(73) Assignee: Fishing Science LLC, Monument, CO (US)

( * ) Notice: Subject to any disclaimer, the term of this patent is extended or adjusted under 35 U.S.C. 154(b) by 604 days.

(21) Appl. No.: 12/725,931

(22) Filed: Mar. 17, 2010

(65) Prior Publication Data

US 2010/0236127 A1    Sep. 23, 2010

Related U.S. Application Data

(60) Provisional application No. 61/161,549, filed on Mar. 19, 2009.

(51) Int. Cl.
*A01K 91/10* (2006.01)

(52) U.S. Cl.
USPC .............................................. 43/15

(58) Field of Classification Search
USPC .............................................. 43/15
See application file for complete search history.

(56) References Cited

U.S. PATENT DOCUMENTS

| | | | | |
|---|---|---|---|---|
| 77,893 A | * | 5/1868 | Koehler | 43/15 |
| 2,766,543 A | * | 10/1956 | Beck | 43/16 |
| 2,799,111 A | * | 7/1957 | Voboril | 43/15 |
| 2,810,981 A | * | 10/1957 | Littau | 43/16 |
| 3,867,779 A | * | 2/1975 | McMaster | 43/15 |
| 3,943,650 A | * | 3/1976 | Johansson et al. | 43/15 |
| 4,091,558 A | * | 5/1978 | Dethlefs | 43/15 |
| 4,321,767 A | * | 3/1982 | Hodshire | 43/15 |
| 4,332,099 A | * | 6/1982 | Morehead | 43/15 |
| 4,354,324 A | * | 10/1982 | Eblen | 43/15 |
| 4,393,615 A | * | 7/1983 | Hodshire | 43/15 |
| 4,416,079 A | * | 11/1983 | Hodshire | 43/15 |
| 4,434,573 A | * | 3/1984 | Hodshire | 43/15 |
| 4,471,553 A | * | 9/1984 | Copeland | 43/15 |
| 4,872,280 A | * | 10/1989 | Smith | 43/15 |
| 4,941,278 A | * | 7/1990 | Verkuil | 43/15 |
| 4,993,181 A | * | 2/1991 | Cooper | 43/15 |
| 5,050,333 A | * | 9/1991 | Debreczeni | 43/15 |
| 5,408,779 A | * | 4/1995 | Parker | 43/15 |
| 5,495,688 A | * | 3/1996 | Sondej et al. | 43/15 |
| 5,855,542 A | * | 1/1999 | Wilks | 493/15 |
| 6,751,900 B1 | * | 6/2004 | Paulson et al. | 43/15 |
| 6,772,551 B1 | * | 8/2004 | Bielinski et al. | 43/15 |
| 7,152,360 B1 | * | 12/2006 | Neufeld | 43/15 |
| 7,461,475 B2 | * | 12/2008 | Zyryanov | 43/15 |
| 7,503,140 B2 | * | 3/2009 | Polzin | 43/15 |

(Continued)

FOREIGN PATENT DOCUMENTS

| | | | |
|---|---|---|---|
| FR | 2651412 A1 | * | 3/1991 |
| WO | WO 9528080 A1 | * | 10/1995 |
| WO | WO 9610330 A1 | * | 4/1996 |
| WO | WO 2006024235 A1 | * | 3/2006 |

*Primary Examiner* — Darren W Ark

(74) *Attorney, Agent, or Firm* — Dale B Halling

(57) ABSTRACT

The invention is directed to an automatic hook setter having a housing with an internal cavity having an opening with several notches. An eyelet trigger is attached to the housing by a pivot in the internal cavity and has a first end and a second end. The second end extends outside of the housing. A fishing line trigger is pivotally attached to the housing and has a first position and a second position. In the second position the fishing line trigger overlaps the notches to form a number of slots. A lanyard is attached to the housing. One end of the lanyard has cord clip.

12 Claims, 4 Drawing Sheets

U.S. PATENT DOCUMENTS

| | | | |
|---|---|---|---|
| 7,716,867 B2* | 5/2010 | Dungan | 43/15 |
| 8,099,898 B2* | 1/2012 | Dungan | 43/15 |
| 8,291,635 B2* | 10/2012 | Payne | 43/15 |
| 2004/0074133 A1* | 4/2004 | Hampton | 43/15 |
| 2006/0064918 A1* | 3/2006 | Schnur | 43/15 |
| 2007/0130818 A1* | 6/2007 | Green | 43/15 |
| 2011/0219661 A1* | 9/2011 | Remington | 43/15 |
| 2012/0102812 A1* | 5/2012 | Payne | 43/15 |
| 2012/0174465 A1* | 7/2012 | Johnson | 43/15 |

* cited by examiner

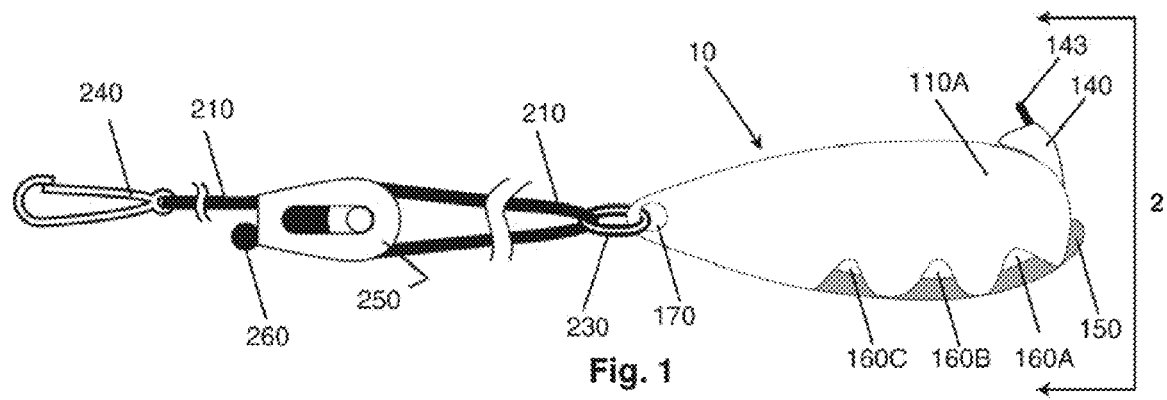
Fig. 1
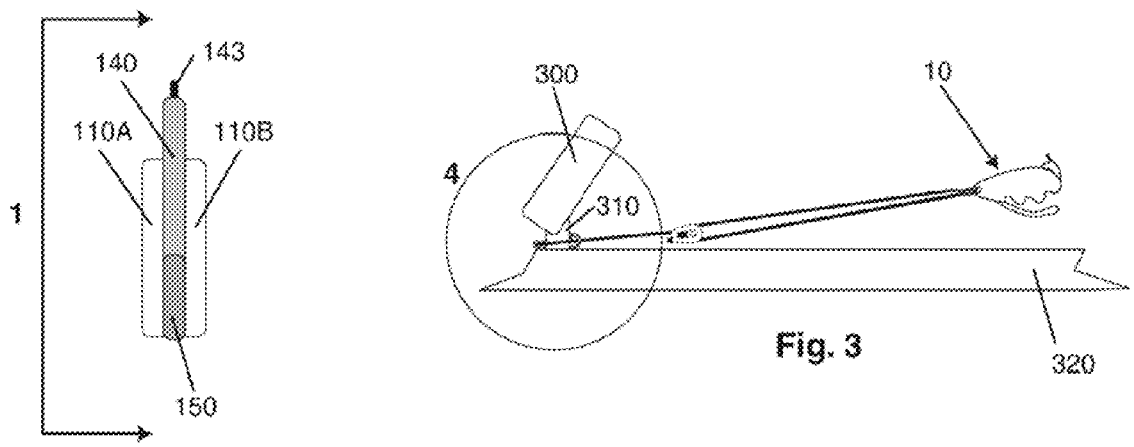
Fig. 2
Fig. 3
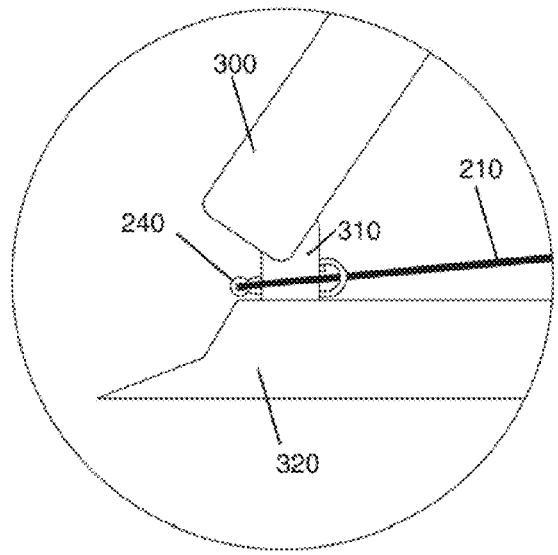
Fig. 4

AUTOMATIC HOOK SETTING DEVICE

RELATED APPLICATIONS

The present invention claims priority on provisional patent application, Ser. No. 61/161,549, filed on Mar. 19, 2009, entitled "Automatic Hook Setter" and is hereby incorporated by reference.

STATEMENT REGARDING FEDERALLY SPONSORED RESEARCH

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING

Not Applicable

BACKGROUND OF THE INVENTION

Fishermen often fail to notice that a fish is biting their bait or lure until it is too late to set the hook. This can be the result of inattentiveness, or because the fisherman is tending two or more poles and the bite occurs on the pole the fisherman is not tending. There have been numerous attempts to solve this problem. One solution has been to have a triggering stick that fits in the last eyelet of the pole and has a string that connects to an interior eyelet. The pole is bent when the triggering stick is placed in the last eyelet, since the string is shorter than the straight length of the pole. The fishing line is placed through a groove at the end of the triggering stick and when a fish bites the lure the line is pulled, which pulls the triggering stick out of the eyelet and cause the pole to snap back into position. Unfortunately, it is often difficult to set the triggering stick in the last eyelet. The triggering stick also flies free when the line is pulled on by the fish and can get wrapped around the fishing line or otherwise impede the process of reeling in the fish.

Thus there exists a need for a hook setter that is easy to use and does not impede the process of reeling in the fish.

BRIEF SUMMARY OF INVENTION

An automatic hook setter that overcomes these and other problems a housing with an internal cavity having an opening with several notches. An eyelet trigger is attached to the housing by a pivot in the internal cavity and has a first end and a second end. The second end extends outside of the housing. A fishing line trigger is pivotally attached to the housing and has a first position and a second position. In the second position the fishing line trigger overlaps the notches to form a number of slots. A cord attached to the housing.

In one embodiment, the eyelet trigger has an eyelet trigger pin extending from the second end of the eyelet trigger. A spring with a first end is attached to the housing and a second end is attached to an end of the eyelet trigger. In another embodiment, the eyelet trigger has an eyelet pawl on the first end. The fishing line trigger has a fishing line shoulder that mates with the eyelet pawl in one embodiment.

In operation the cord is attached to an end of the fishing pole or a railing of a dock or boat. The fisherman then casts his lure or bait. The housing of the hook setter is pulled unspooling the lanyard to a desired length. The fishing line trigger is opened and the fishing line is inserted into one of the three notches in the housing. The fishing line trigger is then closed to capture the fishing line. The eyelet trigger pin is then placed in the second eyelet from the tip by bending the fishing pole. In this position, the pawl of the eyelet trigger is pressing against the shoulder of the fishing line trigger. When a fish pulls on the fishing line the fishing line trigger is rotated until the fishing line shoulder no longer engages the eyelet pawl. When the eyelet trigger is released the fishing pole snaps setting the hook.

BRIEF DESCRIPTION OF THE SEVERAL VIEWS OF THE DRAWINGS

FIG. 1 is a side view of an automatic hook setter in accordance with one embodiment of the invention;

FIG. 2 is an end view of the automatic hook setter in accordance with one embodiment of the invention;

FIG. 3 is a side view of the automatic hook setter with a rod holder in accordance with one embodiment of the invention;

FIG. 4 is an expanded view of the lanyard of the automatic hook setter attached to the rod holder;

DETAILED DESCRIPTION OF THE INVENTION

Figure 5:
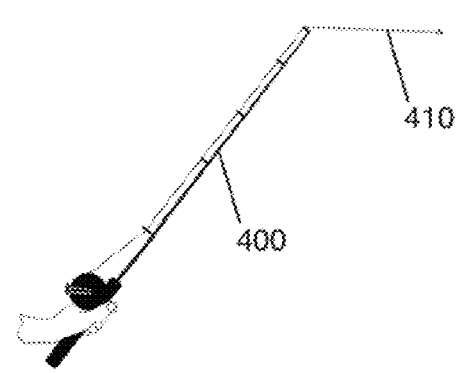
FIG. 5 is a side view of a fishing rod in accordance with one embodiment of the invention.
Figure 6:
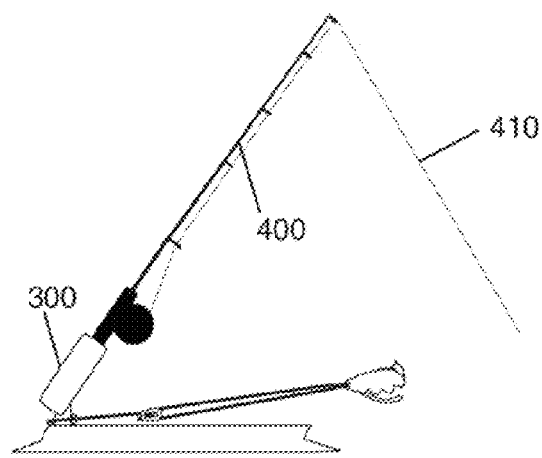
FIG. 6 is a side view of the automatic hook setter and fishing rod in accordance with one embodiment of the invention.

The invention is directed to an automatic hook setter having a housing with an internal cavity having an opening with several notches. An eyelet trigger is attached to the housing by a pivot in the internal cavity and has a first end and a second end. The second end extends outside of the housing. A fishing line trigger is pivotally attached to the housing and has a first position and a second position. In the second position the fishing line trigger overlaps the notches to to form a number of slots. A lanyard is attached to the housing. One end of the lanyard has cord clip.

In operation the cord is attached to an end of the fishing pole or a railing of a dock or boat. The fisherman then casts his lure or bait. The housing of the hook setter is pulled unspooling the lanyard to a desired length. The fishing line trigger is opened and the fishing line is inserted into one of the three notches in the housing. The fishing line trigger is then closed to capture the fishing line. The eyelet trigger pin is then placed in the second eyelet from the tip by bending the fishing pole. In this position, the pawl of the eyelet trigger is pressing against the shoulder of the fishing line trigger. When a fish pulls on the fishing line the fishing line trigger is rotated until the fishing line shoulder no longer engages the eyelet pawl. When the eyelet trigger is released the fishing pole snaps setting the hook.

The disclosed invention is described below with reference to the accompanying figures in which like reference numbers are used to refer to parts of the disclosed invention.

FIG. 1 illustrates a side view of the preferred embodiment of inventive Hook Setter 10 and its associated lanyard assembly. The Hook Setter 10 body includes hook setter body side cover 110A with an internal cavity, rod eyelet trigger 140, rod eyelet trigger pin 143, fishing line trigger 150, fish line bite sensitivity slots 160A-light bite, 160B-medium bite, 160C-heavy bite, and lanyard attach point 170. Also illustrated in FIG. 1 is Hook Setter 10's lanyard assembly consisting of slotted ring 230, lanyard cord 210, cord lock/adjuster 250, cord stop 260, and cord clip 240.

FIG. 2 illustrates a front view of Hook Setter 10, illustrating side cover 110A, side cover 110B, rod eyelet trigger 140, rod eyelet trigger pin 143, and fishing line trigger 150.

FIG. 3 illustrates a side view of Hook Setter 10 and its lanyard attached to a rod holder 300 and rod holder stem 310. Attachment is made by looping lanyard 210 around stem 310 followed by hooking lanyard 210 to itself with cord clip 240. See blow-up FIG. 4. Platform 320 represents a generic platform such as a boat, pier, beach, etc. where rod holders are typically mounted. Although a rod holder is illustrated, the lanyard may be mounted to any stationary object or to the rod's handle. The key point is that when the Hook Setter is triggered, it falls away from the rod and does not interfere with the rod's action or with reeling in the fish. See FIG. 12.

Figure 7:
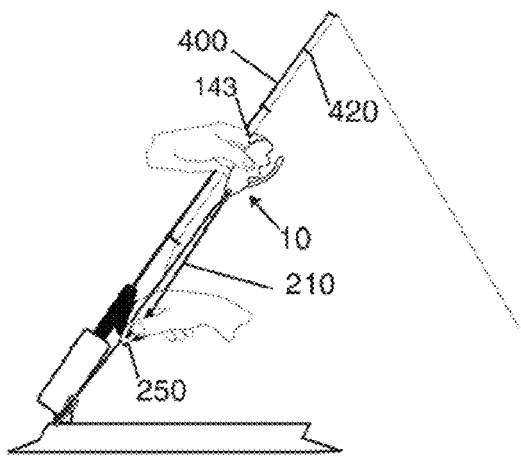
FIG. 7 is a side view of the automatic hook setter and fishing rod in accordance with one embodiment of the invention.
Figure 8:
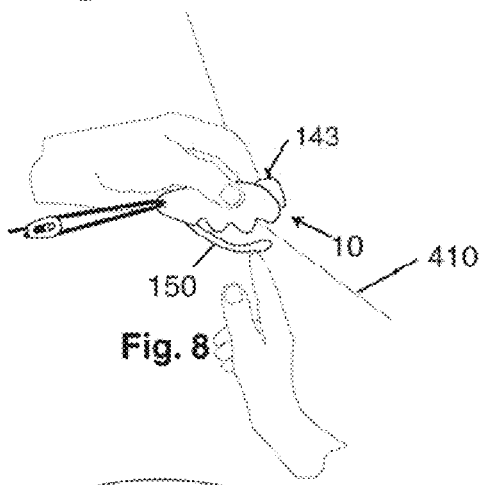
FIG. 8 is a close up view of the automatic hook setter capturing the fishing line in accordance with one embodiment of the invention.
Figure 9:
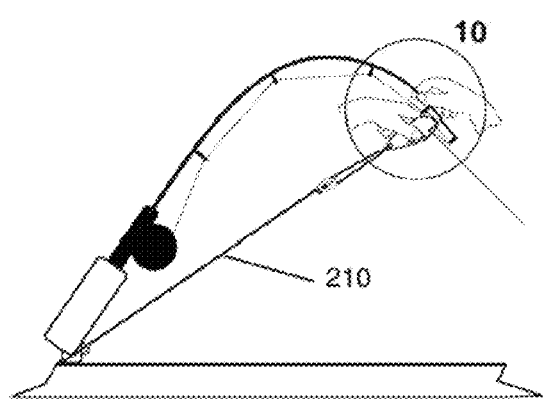
FIG. 9 is a side view of the automatic hook setter being attached to the fishing rod in accordance with one embodiment of the invention.
Figure 10:
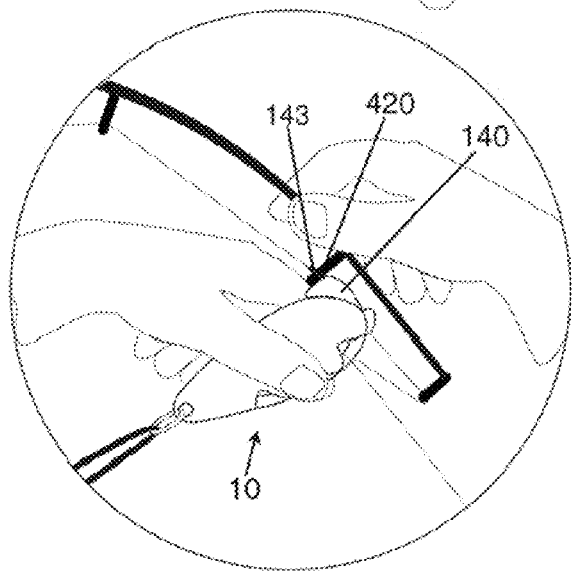
FIG. 10 is a close up view of the automatic hook setter attaching to an eyelet of the fishing line in accordance with one embodiment of the invention.

FIGS. 5 through 10 illustrate the way Hook Setter 10 is connected to a rod 400 and a rod holder 300 so that it is ready to automatically set the hook when a fish bites. In FIG. 5 the fisherman casts a lure or bait to where he or she thinks the fish are. After the cast in FIG. 5, FIG. 6 the line 410 is tightened as desired, and the rod is placed in rod holder 300. FIG. 7 illustrates how the fisherman, using both hands, adjusts cord lock/adjuster 250 to lengthen or shorten lanyard 210. The object is to place Hook Setter 10's rod eyelet trigger pin 143 about twelve inches or so below the second rod eyelet 420. Depending upon the rod type, any eyelet except the tip may be used as a connect point to hold the rod in tension. The second or third eyelet back from the tip eyelet accommodates most rods. FIG. 8 illustrates a fisherman connecting fishing line 410 in Hook Setter 10's first line sensitivity slot 160A. See FIG. 1. Once the line is in slot 160 A, B, or C, 160A being illustrated, fishing line trigger 150 is closed and held closed by hand while hook setter 10's eyelet trigger pin 143 is placed in eyelet 420 FIG. 9. See blow-up FIG. 10.

Figure 11:
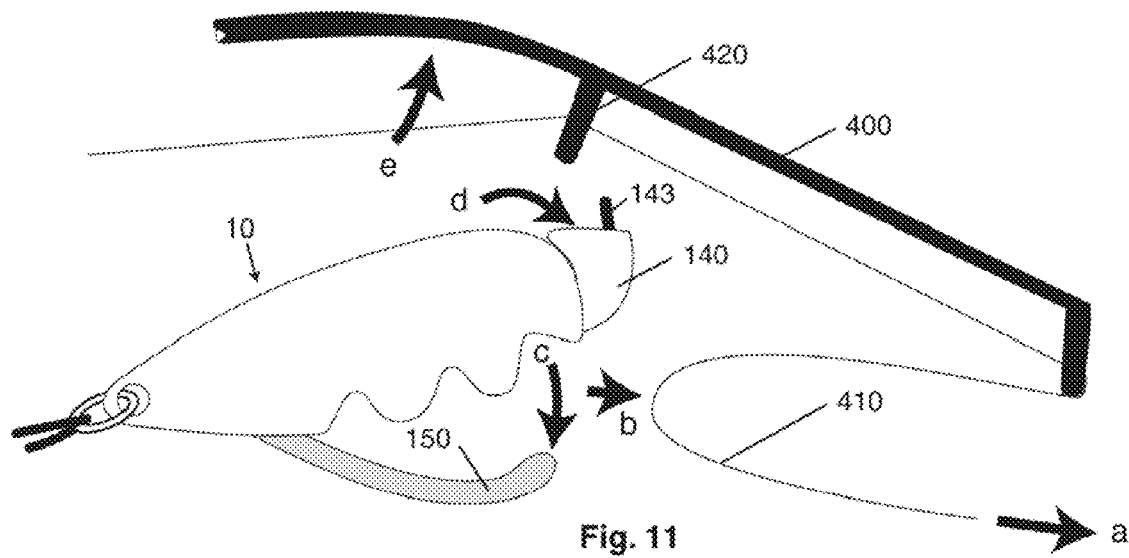
FIG. 11 is a close up view of the automatic hook setter triggering when the fishing line is pulled in accordance with one embodiment of the invention.
Figure 12:
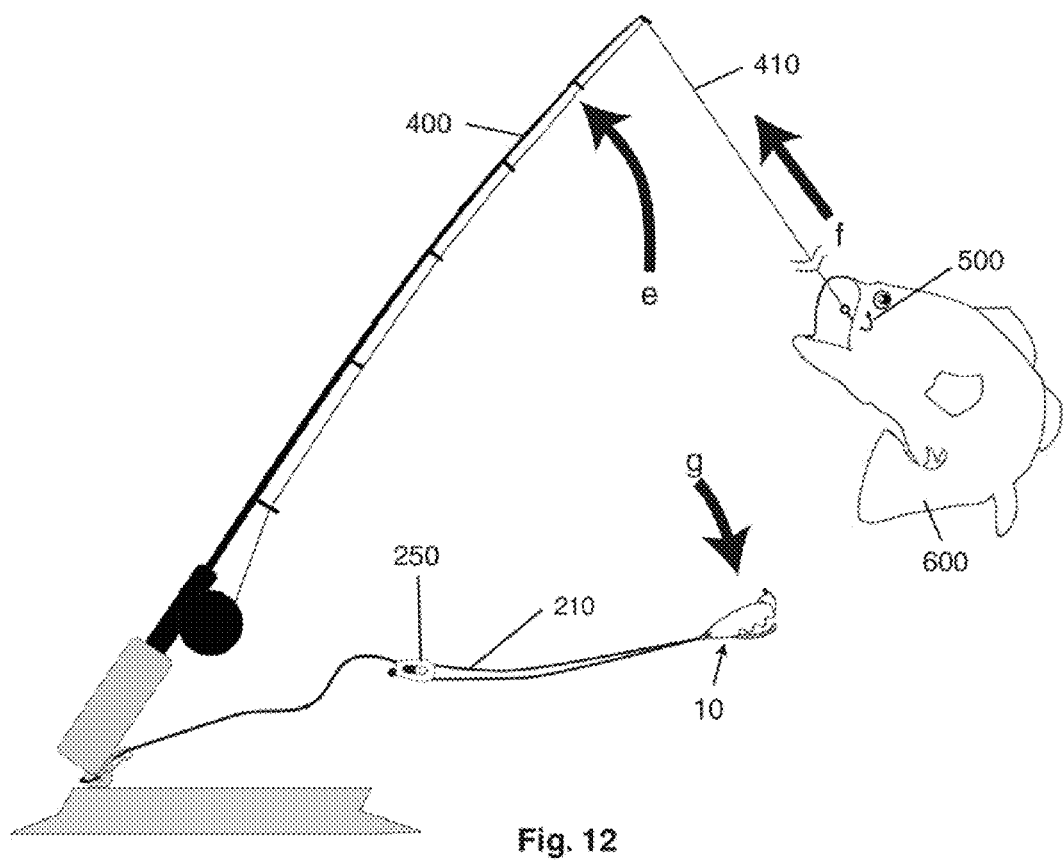
FIG. 12 is a side view of the automatic hook setter having triggered and hooking a fish in accordance with one embodiment of the invention.

FIG. 11 illustrates, with directional arrows a-e, the sequence of events that takes place between Hook Setter 10 and rod 400 when a fish bites. When a fish bites, illustrated by arrow a, the fishing line 410 is pulled away from the Hook Setter 10. This pull on fishing line 410, arrows a and b, moves fishing line trigger 150 downward as illustrated by arrow c. Fishing line trigger 150 in turn releases rod eyelet trigger 140 and rod eyelet trigger pin 143 in the direction of arrow d. Rod eyelet trigger pin 143, was holding rod 400 in tension by captivating rod eyelet 420. Arrow e shows the direction of rod 400 as it relaxes. FIG. 12, arrow e further illustrates that when rod 400 relaxes it jerks fishing line 410 in the direction of arrow f. This jerking of fishing line 420 causes fishhook 500 to penetrate fish 600's flesh, thus setting the hook. Also illustrated in FIG. 12 is how Hook Setter 10 and its associated lanyard falls down and out of the way of rod 400, arrow g.

Figure 13:
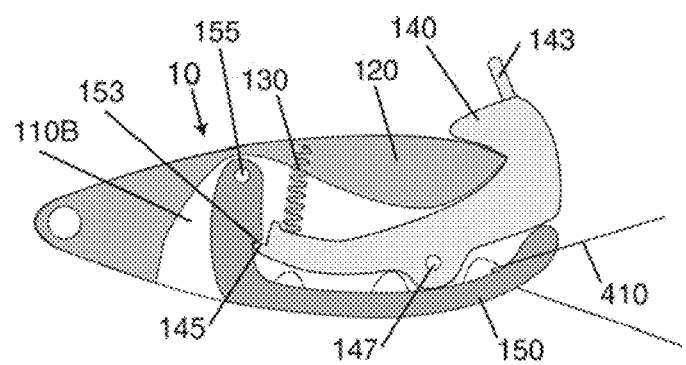
FIG. 13 is a cross sectional view of the automatic hook setter in a cocked position in accordance with one embodiment of the invention.

FIG. 13 illustrates Hook Setter 10 with side cover 110A removed. In FIG. 13 it can be seen how the fishing line trigger shoulder 153 on fishing line trigger 150 interacts with rod eyelet trigger pawl 145 on rod eyelet trigger 140. Anytime fishing line 410 is pulled away from Hook Setter 10 by a fish's bite, it causes fishing line trigger shoulder 153 to disengage rod eyelet trigger 140's pawl 145.

Figure 14:
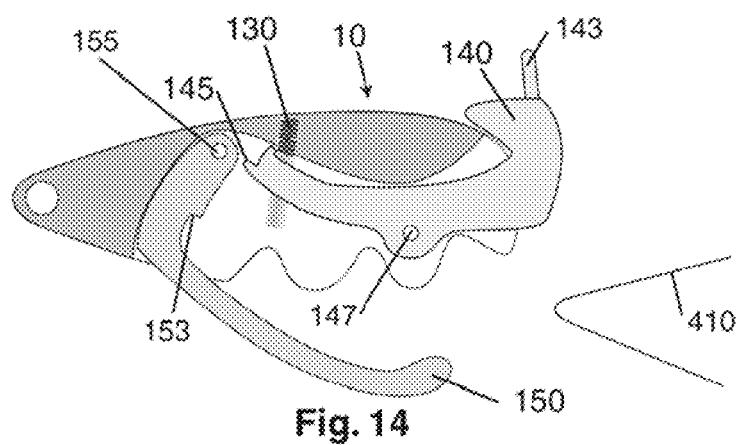
FIG. 14 is a cross sectional view of the automatic hook setter in a released position in accordance with one embodiment of the invention.

In FIG. 14, when rod eyelet pawl 145 is released, rod eyelet trigger 140 pivots about its pivot point 147. Rod eyelet trigger 140's rod eyelet trigger pin 143 then releases the rod's eyelet allowing the rod to relax as illustrated in FIGS. 11 and 12. Hook Setter 10's bias spring 130 may be used to return rod eyelet trigger 140 back to its pre triggered position. Although bias spring 130 simplifies resetting Hook Setter 10 it is not necessary to Hook Setter 10's triggering performance.

Thus there has been described an automatic hook setter that is easy to use and does not impede the process of reeling in the fish.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An automatic hook setting device, comprising:
    a housing comprising a first side cover and a second side cover forming an internal cavity therebetween, each of the first and second side covers having a plurality of notches defined in a lower edge thereof;
    an eyelet trigger attached to the housing;
    a fishing line trigger pivotally attached to the housing between the first side cover and the second side cover and having a first position and a second position, in the second position the fishing line trigger has a portion which extends between and overlaps the plurality of notches in the first and second side covers to form a plurality of enclosed slots defined between inner portions of each of the notches at upper extents of the slots and the portion of the fishing line trigger at lower extents of the slots and engages the eyelet trigger, wherein the portion of the fishing line trigger in the first position is spaced below and away from the lower edges of the first and second side covers and the plurality of notches so as not to form the plurality of enclosed slots and does not engage the eyelet trigger; and
    a cord attached to the housing.
2. The device of claim 1, wherein the fishing line trigger has a pivot point in the internal cavity.
3. The device of claim 1, wherein the eyelet trigger has a pivot point in the internal cavity.
4. The device of claim 3, further including a spring having a first end attached to the housing and a second end attached to an end of the eyelet trigger.
5. The device of claim 4, wherein the end of the eyelet trigger has an eyelet trigger pawl.
6. The device of claim 5, wherein the fishing line trigger has a fishing line trigger shoulder.

7. An automatic hook setting device, comprising:
a housing comprising a first side cover and a second side cover forming an internal cavity therebetween with an opening, each of the first and second side covers having a plurality of notches defined in a lower edge thereof;
an eyelet trigger attached to the housing by a pivot in the internal cavity at a first end of the eyelet trigger, and the eyelet trigger having a second end which extends outside of the housing;
a fishing line trigger pivotally attached to the housing between the first side cover and the second side cover and having a first position and a second position, in the second position the fishing line trigger has a portion which extends between and overlaps the plurality of notches in the first and second side covers to form a plurality of enclosed slots defined between inner portions of each of the notches at upper extents of the slots and the portion of the fishing line trigger at lower extents of the slots and engages the eyelet trigger, wherein the portion of the fishing line trigger in the first position is spaced below away from the lower edges of the first and second side covers and the plurality of notches so as not to form the plurality of enclosed slots and does not engage the eyelet trigger; and
a cord attached to the housing.

8. The device of claim 7, wherein the eyelet trigger has an eyelet trigger pin extending from the second end of the eyelet trigger.

9. The device of claim 8, further including a spring having a first end attached to the housing and a second end attached to the first end of the eyelet trigger.

10. The device of claim 9, wherein the eyelet trigger has an eyelet trigger pawl on the second end.

11. The device of claim 10, wherein the fishing line trigger has a fishing line trigger shoulder that mates with the eyelet trigger pawl.

12. The device of claim 11, wherein the cord is a lanyard.

* * * * *